United States Patent
Liu et al.

(10) Patent No.: US 8,554,720 B2
(45) Date of Patent: *Oct. 8, 2013

(54) PROCESSING, BROWSING AND EXTRACTING INFORMATION FROM AN ELECTRONIC DOCUMENT

(75) Inventors: Shi Xia Liu, Beijing (CN); Li Ping Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 636 days.

This patent is subject to a terminal disclaimer.

(21) Appl. No.: 12/109,009

(22) Filed: Apr. 24, 2008

(65) Prior Publication Data

US 2008/0208857 A1   Aug. 28, 2008

Related U.S. Application Data

(63) Continuation of application No. 11/011,519, filed on Dec. 14, 2004, now Pat. No. 7,366,715.

(30) Foreign Application Priority Data

Dec. 17, 2003  (CN) .......................... 2003 1 0123118

(51) Int. Cl.
  *G06F 7/00*  (2006.01)
  *G06F 17/00*  (2006.01)
  *G06F 17/30*  (2006.01)
(52) U.S. Cl.
  USPC ........... 707/608; 707/713; 707/722; 707/723; 707/736
(58) Field of Classification Search
  USPC .............. 707/6, 722, 723, 728, 608, 713, 736
  See application file for complete search history.

(56) References Cited

U.S. PATENT DOCUMENTS

| | | | |
|---|---|---|---|
| 4,554,631 A | 11/1985 | Reddington | |
| 5,640,553 A | 6/1997 | Schultz | |
| 5,708,825 A * | 1/1998 | Sotomayor | ................... 715/205 |
| 5,794,236 A | 8/1998 | Mehrle | |
| 6,012,053 A | 1/2000 | Pant et al. | |
| 6,122,647 A | 9/2000 | Horowitz et al. | |

(Continued)

OTHER PUBLICATIONS

Ion Muslea, "Extraction Patterns for Information Extraction Tasks: A Survey", 1999, AAAI Technical Report, pp. 1-6.*

(Continued)

*Primary Examiner* — Apu Mofiz
*Assistant Examiner* — Jared Bibbee
(74) *Attorney, Agent, or Firm* — Scully, Scott, Murphy & Presser, P.C.; William Stock, Esq.

(57) ABSTRACT

The present invention relates to methods, apparatus and systems for processing an electronic document and its corresponding device. It provides methods for browsing an electronic document and its corresponding browser, and methods for extracting information segments from an electronic document and its corresponding system for the same. An example of a method for processing an electronic document comprises extracting one or more information segments of the domains to which the electronic document relates from the electronic document being written by an author, and correspondingly storing said extracted information segments with said document. Wherein one or more information extraction patterns are used to extract information segments of different domains to which the electronic document relates from said document. And the extracted information segments are verified by the writer so as to ensure its correctness, reliability and readability.

15 Claims, 5 Drawing Sheets

(56) References Cited

U.S. PATENT DOCUMENTS

| | | | |
|---|---|---|---|
| 6,519,580 | B1 | 2/2003 | Johnson et al. |
| 6,529,911 | B1 | 3/2003 | Mielenhausen |
| 6,961,954 | B1* | 11/2005 | Maybury et al. ............. 725/53 |
| 7,136,875 | B2 | 11/2006 | Anderson et al. |
| 2001/0047351 | A1 | 11/2001 | Abe |
| 2002/0026386 | A1 | 2/2002 | Walden |
| 2002/0049705 | A1 | 4/2002 | Haviv-Segal et al. |
| 2002/0196288 | A1 | 12/2002 | Emrani |
| 2003/0028564 | A1 | 2/2003 | Sanfilippo |
| 2003/0061200 | A1* | 3/2003 | Hubert et al. ............... 707/3 |
| 2003/0069880 | A1 | 4/2003 | Harrison et al. |
| 2003/0187834 | A1 | 10/2003 | Oda et al. |
| 2005/0108200 | A1 | 5/2005 | Meik et al. |

OTHER PUBLICATIONS

Richard Power et al, "What You See Is What You Meant: direct knowledge editing with natural language feedback", 1998, ECAI 98. 13th European Conference on Artificial Intelligence, pp. 677-681.*

Doug Downey et al, "Learning Text Patterns for Web Information Extraction and Assessment", 2002, American Association for Artificial Intelligence, pp. 1-6.*

Ellen Riloff, "Automatically Generating Extraction Patterns from Untagged Text", 1996, AAAI-96 Proceedings, pp. 1044-1049.*

U.S. Appl. No. 11/012,674, filed Dec. 15, 2004, Lead Inventor: Shi Liu.

U.S. Appl. No. 11/014,521, filed Dec. 16, 2004, Lead Inventor: Shi Liu.

"Watson Solves Myster of Searching Information on the Web", Oct. 19, 1999, Science Daily, pp. 1-3, Retrieved Mar. 23, 2007 from http://www.sciencedaily.com/releases/1999/10/991019074447.htm.

Budzik, et al., "Watson: Anticipating and Contextualizing Information Needs", 1999, pp. 1-14, Retrieved Mar. 23, 2007 from <http"://sifaka.cs.uiuc.edu/xshen/reference/BudzikJay_1999JASIS_Watson.pdf>.

Budzik, et al., "User interactions with everyday applications as context for just-in-time information acess", 2000, ACM, pp. 1-8, Retrieved Mar. 23, 2007 from <http.//delivery.acm.org/10.1145/330000/325776/p44-budzik.pdf?key1=325776&key2=2348194711&coll=GUIDE&dI=GUIDE&CFID=18285234&CFTOKEN=30355385>.

Edmundson, et al., "Automatic Abstracting and indexing-Survey and Recommendations", ACM, May 1961, pp. 226-234.

* cited by examiner

PROCESSING, BROWSING AND EXTRACTING INFORMATION FROM AN ELECTRONIC DOCUMENT

RELATED APPLICATIONS

This application is a continuation application of U.S. application Ser. No. 11/011,519, filed Dec. 14, 2004.

TECHNICAL FIELD

The present invention generally relates to the technology of data processing and, more particularly to a method for processing an electronic document and its corresponding device, a method for browsing an electronic document and its corresponding browser, and a method for extracting information from an electronic document and its corresponding system for the same.

BACKGROUND DESCRIPTION

With the popularity of computer technology and the rapid development of the Internet, an abundance of information is coming forth in an electronic document format. To meet the big challenge brought by the information explosion, it is imminently requiring a number of automatic tools to help people extract the bits of information that are needed from a vast sea of information. Under this given background, information extraction (IE) comes into being.

Information extraction is a form of shallow text processing that locates a specified set of relevant information (entities, events, etc.) in a natural-language document, with the objective of having the text information structured and tabulated. The primary function of information extracting system is to extract particular entity information. Taking an information extracting system for example, the information extraction process typically including: 1) identifies; 2) extracts specific information located in non-structured textual data; and 3) generates the output as has been requested. Such technology is disclosed by, for example, N. Catala, N. Castell, M. Martin, *ESSENCE: a Portable Methodology for acquiring information extraction Patterns. Proceedings of 14$^{th}$ European Conference on Artificial Intelligence (ECAI*-2000), 411-415, Berlin, 2000, which is herewith incorporated by reference. The extracted information are structurally described, and can be directly stored in a database for user's query, further analysis and utilization.

There are two main approaches to the design of IE systems, which can be the Knowledge Engineering Approach and the Automatic Training Approach. For example, Appelt, D. E. and Israel, D. J. *Introduction to information extraction Technology, In Proceedings of the 16$^{th}$ International Joint Conference on Artificial Intelligence,* 1999, which is herewith incorporated by reference, is disclosed in more detail the discussed technology.

The Knowledge Engineering Approach is characterized by manually compiling rules to enable the IE system to process the information extraction related issues of particular knowledge domain. It requires the "knowledge engineer" who compiles the rules to be quite familiar with the same knowledge domain, it is obviously the case that the skill of the knowledge engineer plays an important role in the level of performance that will be achieved by the overall system. In addition to requiring skill and detailed knowledge of a particular IE system, the Knowledge Engineering Approach usually requires a lot of additional labor as well for optimizing self-performance. For example, building a high performance system is usually an iterative process whereby a set of rules is written. After that, the system is run over a training corpus which has been annotated, and the output is examined to see whether the rules are under- and over-generate. The knowledge engineer then makes appropriate modification to the rules, and iterates the process till a complete set of rules is achieved. This is a difficult and time-consuming task, and requires a high level of intelligence.

The Automatic Training Approach is not necessary to have such professional knowledge engineer, i.e. it is not necessary to have someone on hand with detailed knowledge of how the IE system works, or how to write rules for it. This approach needs the user to provide a great deal of typical learning (training) corpus. The system is mainly trained by (training) sample which has been annotated and extracts rules from these samples. All who are familiar with the knowledge domain can annotate the learning (training) corpus and build the relevant corpus in accordance with the pre-defined criterion. Then, after being trained, systems can process entirely new texts. Following this approach, it is not necessary to have users on hand with detailed knowledge of how the IE system works, or how to write rules for it. It is necessary only to have users who know enough about the domain and the task to take a corpus of texts, and annotate the texts appropriately for information being extracted. Typically, the annotations would focus on one particular aspect of the system's processing. For example, a name recognizer would be trained by annotating a corpus of texts with the domain-relevant proper names. Once a suitable training corpus has been annotated, a training algorithm is run, resulting in information that a system can employ in analyzing novel texts.

Although many methods have been proposed for extracting information from unstructured text, none of these methods can produce satisfying result due to the limitation of the existing learning and training algorithms. As for the Knowledge Engineering Approach, the construction of IE patterns are probably very time-consuming and needs the knowledge engineer who is responsible for writing rules to have an in-depth acquaintance with the domain knowledge of which an ordinary user is short. The Automatic Training Approach is not that time-consuming comparing with the Knowledge Engineering Approach, but sufficient training data is required to ensure a high processing quality. The major limitations of existing Automatic Training Approach for building IE patterns are: dependence on linguistic processing, machine learning or data mining techniques. Most of the methods need an annotated training corpus, which is a very tedious work and must be done by a domain expert.

In addition, in the traditional scenario, the electronic document writing tools are independent from the tools that users use to manage documents, such as information extraction (IE) systems. The current situation is that the writer does not care how the reader will leverage the content when he prepares it. While at the same time, from the information-accessing point of view, the user feels great challenge to get the right thing he/she wants.

Moreover, the current technologies work mainly at the word level understanding, while the real world applications, such as the electronic document managing tools and the electronic document information extraction tools need sentence and document level understanding together with semantic capabilities to meet the customers' requirements in deed.

SUMMARY OF THE INVENTION

Therefore, in order to solve the above problem with the existing information extraction technologies, the present invention suggests the writer be enabled to prepare relevant information for future information extraction during the electronic document is being prepared, that is, when the writer writes a piece of text, there is a set of information processing tools available at his hand for the convenience of contributing to users' information extraction later on. More specifically, when preparing a document, the writer can take advantage of existing knowledge and tools (such as IE engines and extraction patterns designed for various domains) to extract useful information required by particular domain users from the edited document. And the extracted particular domain-specific information which is attached in the electronic document gives domain users an easy way to utilize the information which is extracted from the electronic document. In addition, when the electronic document which corresponds to the information concerning one particular domain is being read, the knowledge tags of the reliable information concerning the particular domain to which the electronic document relates can also be read, enabling the domain user to make a prompt decision. Moreover, the particular domain-specific information which is stored in said document is verified ones, thereby more accurately reflecting the particular domain profile.

An example of an electronic document processing method is provided according to one aspect of the invention. The method comprises the steps of: extracting one or more information of the domains to which the electronic document relates from the electronic document being written by an author; and correspondingly storing said extracted information with said document.

An electronic document processing device is provided according to another aspect of the invention. The device comprises an electronic document editing unit for editing electronic document; an information extraction pattern selecting unit for selecting information extraction patterns for said document from various information extraction patterns; an information extraction unit for extracting the list of information segments of the domains to which the electronic document relates according to the information extraction patterns selected; an extracted information generating unit for selecting the information segments most relevant to said document from said list of extracted information; and an extracted information storing unit for correspondingly storing the information segments generated by extracted information generating unit with said document.

An electronic document browsing method is provided according to another aspect of the invention. It comprises steps of: reading the information segments which are extracted from said document; presenting the read information extracted from said document to the user; and presenting said user with the content of the electronic document relating to said extracted information.

Also provided are an electronic document browser, an information extracting method for electronic document, and an information extracting system for electronic document.

BRIEF DESCRIPTION OF THE DRAWINGS

With the illustrations in attached figures and the detailed description of the specific embodiments, the present invention's features, advantages, objects and useful effects will be more apparent, wherein.

DETAILED DESCRIPTION OF THE INVENTION

Figure 1:
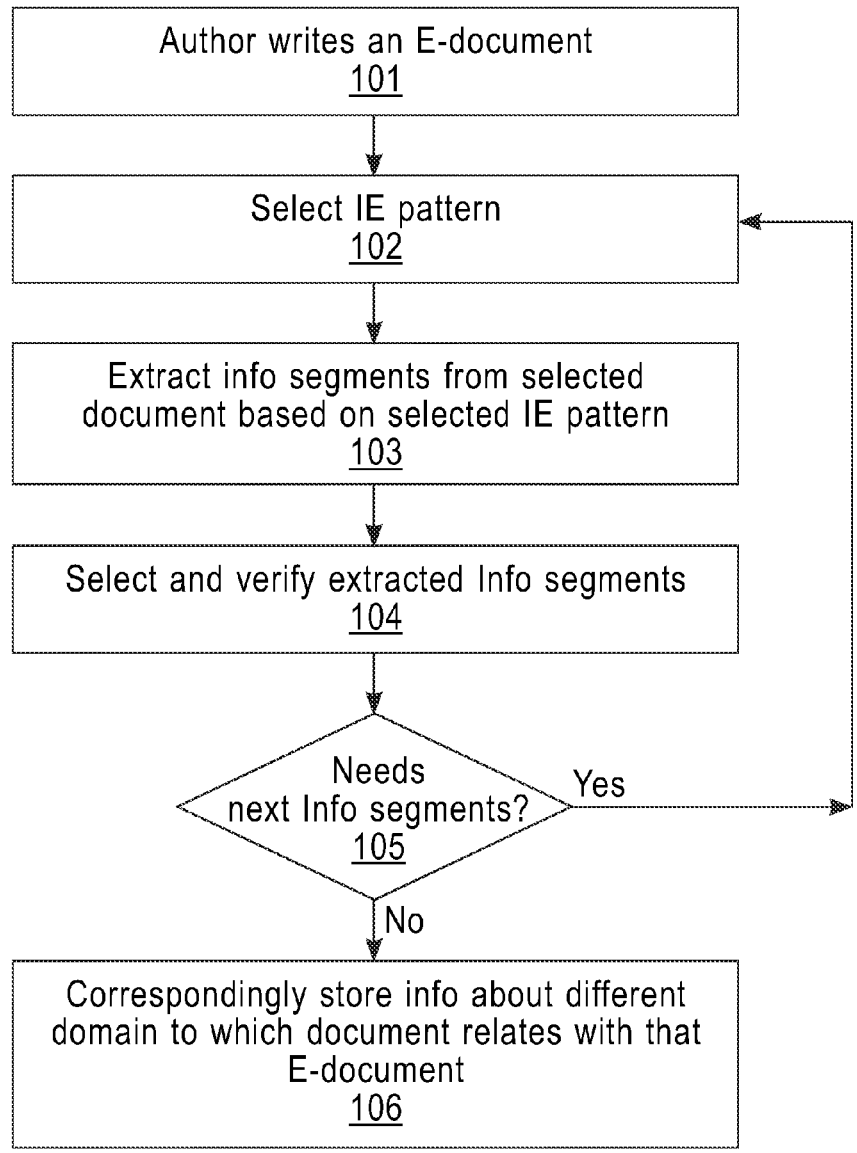
FIG. 1 is a flowchart showing an electronic document processing method according to an embodiment of the present invention.

The present invention provides that a writer be enabled to prepare relevant information for future information extraction during the electronic document is being prepared, that is, when the writer writes a piece of text, there is a set of information processing tools available at his hand for the convenience of contributing to users' information extraction later on. More specifically, when preparing a document, the writer can take advantage of existing knowledge and tools (such as IE engines and extraction patterns designed for various domains) to extract useful information required by particular domain users from the edited document. And the extracted particular domain-specific information which is attached in the electronic document gives domain users an easy way to utilize the information which is extracted from the electronic document. In addition, when the electronic document corresponds to the information concerning one particular domain is being read, the knowledge tags of the reliable information concerning the particular domain to which the electronic document relates can also be read, enabling the domain user to make a prompt decision. Moreover, the particular domain-specific information which is stored in said document is verified ones, thereby more accurately reflecting the particular domain profile.

An example of an electronic document processing method comprises the steps of: extracting one or more information of the domains to which the electronic document relates from the electronic document being written by an author; and correspondingly storing said extracted information with said document.

An example of an electronic document processing device comprises an electronic document editing unit for editing electronic document; an information extraction pattern selecting unit for selecting information extraction patterns for said document from various information extraction patterns; an information extraction unit for extracting the list of information segments of the domains to which the electronic document relates according to the information extraction patterns selected; an extraction information generating unit for selecting the information segments most relevant to said document from said list of extracted information; and an extracted information storing unit for correspondingly storing the information segments generated by extracted information generating unit with said document.

An example of an electronic document browsing method comprises the steps of: reading the information segments which are extracted from said document; presenting the read information extracted from said document to the user; and presenting said user with the content of the electronic document relating to said extracted information.

An example of an electronic document browser comprises an electronic document browsing unit for browsing the content of electronic document; an extracted information reading unit for reading the information segments which are correspondingly stored with the document, extracted from said document; and an extracted information presenting unit for presenting users with the extracted information segments read by extracted information reading unit.

An example of an information extracting method according to the invention, comprises the steps of: acquiring the information segments which are correspondingly stored with the relevant document and extracted from said document; storing the information segments extracted from said document in a database of extracted information segments; searching the list of information segments corresponding to the query entered by the user; and presenting the user with the extracted information segments which are identical or most similar to the query entered by said user.

An example of an information extracting system for electronic document, according to another aspect of the invention, comprises an extracted information acquiring means for acquiring the information segments which are correspondingly stored with the electronic document and extracted from said document; an extracted information storing database for storing the extracted information segments obtained by said extracted information acquiring means; an extracted information searching means for searching one or more extracted information segments which are identical or most similar to user's query in said extracted information storing database; and an extracted information presenting means for presenting the user with one or more extracted information segments searched by the extracted information searching means. Advantageous embodiments of the invention are explained in detail below with reference to its corresponding drawing.

Electronic Document Processing Method

An electronic document processing method is proposed according to one aspect of the invention. FIG. 1 is a flowchart showing an electronic document processing method according to an embodiment of the present invention. As shown in FIG. 1, in process 101, an author writes an electronic document. The electronic document processing method according to the present invention is based on the traditional document editing method, that is, the writer performs routine operations such as editing, browsing, etc. on the electronic document being written using traditional document editing tools, such as MS Word☐Adobe Writer or WPS, etc. According to the present invention, the information extraction of the electronic document written by the writer is performed at the completion of the electronic document or when said document is partially completed (for example, as one chapter is completed).

Thereafter, in process 102, selecting an information extraction pattern for the electronic document (or certain chapters of the document) edited by the writer is performed. Firstly, pre-processing the electronic document edited by the writer is performed. The major task is paragraph segmentation and stopword removal (i.e. the most commonly used words which has little retrial value, such as "for", "a", "of," and "the", should be excluded from the search scope). Each of said information extraction patterns is a set of predefined matching rules with respect to different domain to be used to extract information from the document. Prior art has designed a number of information extraction patterns for different domains. And the appropriate extraction pattern can be selected either by the writer or by an algorithm. For example, when an extraction pattern is to be selected from a number of extraction patterns by the writer, several representative and typical information segments which correspond to the selected information extraction pattern are also presented to the writer as reference information to assist his selection. And then, the writer chooses an appropriate information extraction pattern according to the following process:

i☐Calculate the similarity between the representative information segments and the sentence in the edited document. For example, the formula (I) shown below can be adopted to calculate the similarity between the sentence segment $S_i$ in the edited document and the typical information segments $IS_j$.

$$relavance_{keywords}(S_i, IS_j) = \sum_k (w_k(KS_i) + w_k(IS_j))/\text{Max}(wkn(S_i), wkn(IS_j)) * 2$$

wherein $w_k(S_i)$ is the weight of $S_i$ of the Kth common keyword between sentence segment $S_i$ in the edited document and the typical information segments $IS_j$, and $w_k(IS_j)$ is the weight (the default value is 1) in $IS_j$ of the Kth common keyword between sentence segment $S_i$ in the edited document and the information segments $IS_j$ in information extraction pattern database, wkn(.) is the sum of weights of all words (excluding stopwords) which form a word string. Herein, the weight $w_k(S_i)$ of the Kth keyword of sentence segment $S_i$ in the edited document can be calculated by the word frequency of occurrence, for instance, tf☐term frequency☐ or tf-idf☐term frequency—inverse document frequency☐method. Method tf calculates the weight of each keyword according to its occurrence frequency in the text segment. Method tf-idf determines the weight of each keyword by calculating tfxidf, tf is the occurrence frequency of the keyword in text segment T, idf is the inverse occurrence frequency of the keyword in all text segments of the document. Thus, method tf-idf can even more reflect the relative importance of each keyword between different text segments. Other methods can certainly be adopted to calculate the weight of keyword.

ii) Rank the corresponding information extraction patterns based on the similarity values calculated between the reference information segments provided and the sentence in the edited document;

iii) Select the extraction pattern with higher ranking values as the candidate extraction pattern for the edited document.

Process 102 further comprises having various extraction patterns structurally organized, that is, having said various extraction patterns organized into a hierarchy structure according to the domain or rank value to which each extraction pattern belongs for the convenience of extraction pattern search.

Returning to FIG. 1 and the process following is 103. Process 103 is to extract particular domain-specific information segments from the edited document, and consequently generate a list of information segments concerning domains to which said document relates according to the selected extraction pattern.

Coming next is process 104. In this process, the writer verifies the information segments (concerning the domains to which the electronic document relates) extracted from the electronic document in the above process. The term of "verifying" means the writer can examine and modify the information extracted from said document to ensure its correctness, reliability and usefulness.

In addition, process 104 further comprises providing reference information segments which are the typical extracted information segments corresponding to the selected information extraction pattern, then calculating the similarity between said extracted information segments and the reference information segments, and verifying the accuracy of said extracted information segments according to the similarity values.

In process 105, the writer makes a judgment of whether more information segments need to be extracted from said document. An electronic document usually covers various content that might relate to different subjects or domains, and users have different purposes as well while searching and reading a document. If a judgment is made in process 105 that more information segments need to be extracted, then go back to process 102, select an appropriate extraction pattern and extract the next information segments from the document; if no more information segments need to be extracted, then proceed with process 106.

In process 106, correspondingly store the information segments (which are extracted from the electronic document and concern different domains to which the electronic document relates) with said document. Specifically, the extracted information segments can be stored into the electronic document as knowledge tags according to the preferred embodiment of the invention. For example, attach tags to the electronic document by using extensible markup language (XML).

In light of the foregoing disclosure, the present invention is not limited to any practical storing method for the extracted information segments, for example, the extracted information segments can be stored either together (namely as one part of the document) or separately with the electronic document as long as they corresponds to said document.

For example, the present embodiment can be applied to the following application scene (from a conference report):

Ranbaxy holds conference on brain disorders Nov. 30, 2004 4:26 PM 1ST Ranbaxy Science Foundation organized its 14th Round Table Conference on "Brain Disorders Across Life Span: Hopes and Challenges" in New Detail on Tuesday The Conference focused on the latest basic research in neurosciences in the understanding of pathogenic mechanisms underlying various brain disorders and to use the expanding knowledge in this field for discovering rational therapies and cure for these disorders.

The programme was jointly moderated by Prof. P. N. Tandon and Prof. Vijaylakshmi Ravindranath, President and Director respectively of the National Brain Research Centre Society, Manesar, Haryana. Distinguished clinicians and neuroscientists from National Brain Research Institute, AIIMS, National Institute of Mental Health & Neurosciences, WHO, Indian Institute of Chemical Biology, University of Delhi South Campus, Jawaharlal Nehru Centre for Advanced Scientific Research, institute for Communicative and Congnitive Neurosciences and Vidya Sagar Institute of Mental Heath & Neurosciences deliberated on the current clinical scenario and potentials of treatment of various neurological and mental illness in the light of latest research and development in neurosciences . . . .

In this practical example, the writer can extract information segments about the location, date, organizer, and the title of the conference when he prepares the document according to the electronic document processing method of the present invention, the extracted information segments can be edited by the following XML (extensible markup language) and stored as knowledge tags.

```
<InformationExtraction>
    <Pattern>ConferenceInfo<\pattern>
    <ExtractedInfo>
        <Time> Tuesday (11/30/2004)</Time>
        <Spot> New Delhi </Spot>
        <Organizer> Ranbaxy Science Foundation </Organizer>
        <Title> Ranbaxy holds conference on brain disorders </Title>
    </ExtractedInfo>
</InformationExtraction>
```

The extraction pattern adopted is the meeting information extraction pattern used by the domain of conference report; the extracted information segments comprise the information about date, location, organizer and title of the conference.

As will be apparent in the light of the foregoing disclosure of the above embodiment, when the electronic document processing method of the present embodiment is adopted, it becomes possible to aid the writer to extract information segments concerning different domains to which the electronic document relates when the electronic document is being prepared, and ensure the accuracy of the information segments extracted from the electronic document by taking advantage of the writer's comprehension over said document without bringing additional workload to the writer. Moreover, as it is possible to extract information segments which fully reflect the domains to which the electronic document relates, therefore users can make retrievals and previews on the electronic document which relates to different domains particular subject by the extracted information segments. On the one hand, it's saving users' reading time by firstly providing them with the information segments concerning the domains to which the electronic document roughly relates before presenting the full content of the electronic document to them; on the other hand, it enables users to quickly obtain the right information segments from said document at the right time for decision-making.

Electronic Document Processing Device

Figure 2:
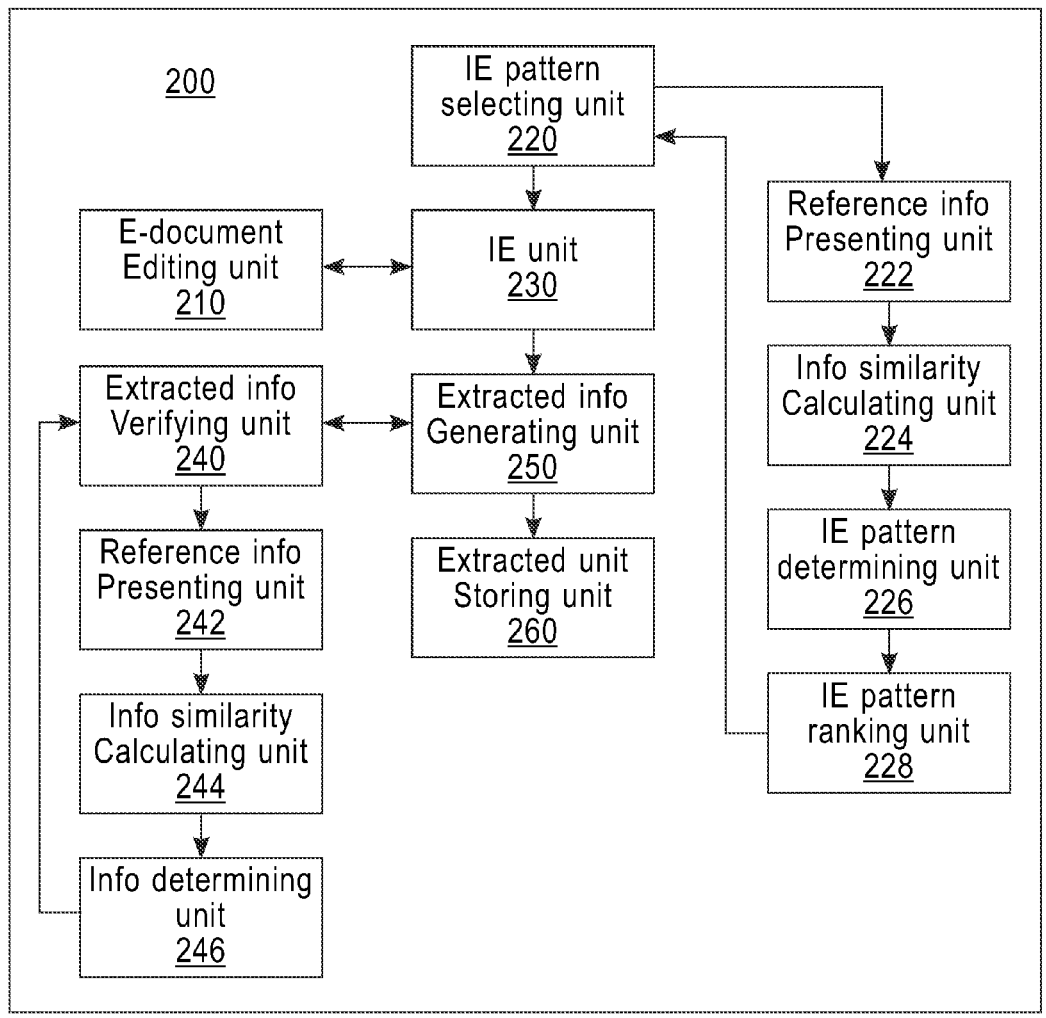
FIG. 2 is a schematic diagram showing the structure of an electronic document processing device according to an embodiment of the present invention.

Under the same invention concept, an electronic document processing device is provided according to one aspect of the invention. FIG. 2 is a schematic diagram showing the structure of an electronic document processing device according to an embodiment of the present invention.

As demonstrated by FIG. 2, the electronic document processing device 200 comprising: an electronic document editing unit 201 for editing electronic documents. It can either be an independent document editing unit or use the existing document editors, such as MS word, Adobe Writer or WPS, etc.; an information extraction pattern selecting unit 202 for selecting one or more extraction patterns for the electronic document being edited, each of said information extraction patterns is a predefined different domain-specific matching rules to be used to extract information segments from documents; an information extraction unit 203 for extracting the list of information segments of the domains to which the electronic document relates from the edited document according to the selected information extraction pattern(s); an extracted information generating unit 205 for selecting the information segments most relevant to said document from said list of extracted information segments; an extracted information verifying unit 204 for allowing the writer to evaluate and modify the information segments generated by the extracted information generating unit 205, thereby ensuring its correctness, readability and usefulness; and an extracted information storing twit 206 for correspondingly storing the extracted information segments generated by the extracted information generating unit 205 with the electronic document.

Furthermore the information extraction pattern selecting unit 202 of the electronic document processing device 200 according to the present embodiment can also comprise a reference information presenting unit (not shown) for presenting die reference information segments of one or more typical extracted information segments corresponding to each extraction pattern, an information similarity calculating unit (not shown) for calculating the similarity between the sentence in the edited document and the reference information segments corresponding to each information extraction pattern; and an information extraction pattern determining unit (not shown) for identifying the extraction patterns (which are ranked by the similarity values) with higher ranking values for said document.

Again, the extraction pattern selecting unit 202 of the embodiment can also comprise an information extraction pattern ranking unit (not shown) for organizing the extraction patterns into a hierarchy structure according to the domain or rank to which each information extraction pattern belongs, enabling users to quick select appropriate information extraction patterns from various information extraction patterns.

In addition, the extracted information verifying unit 204 of the electronic document processing device 200 according to the present embodiment may further comprise a reference information presenting unit (not shown) for presenting the reference information segments of one or more typical extracted information segments corresponding to each information extraction pattern; an information similarity calculating unit (not shown) for calculating the similarity between the extracted sentence and the reference information segments corresponding to each extraction pattern; and an information determining unit (not shown) for selecting the information segments (which are ranked by the similarity values) with higher ranking values.

As will be apparent in the light of foregoing disclosure of the embodiment, when the electronic document processing device of the present embodiment is adopted, the accuracy of the information segments extracted from the electronic document can be ensured by taking advantage of the information (which are stored in the electronic document edited by the foregoing document processing method, extracted from said document and relate to different domains) and the writer's comprehension over the electronic document without bringing additional workload to the writer. Moreover, as it is possible to extract information segments which fully reflect the domains to which the electronic document relates, therefore users can make retrievals and previews on the electronic document which relates to different domains but one particular subject by the extracted information segments. On the one hand, it's saving users' reading time by firstly providing them with the information concerning the domains to which the electronic document roughly relates before presenting the full content of the electronic document to them; on the other hand, it enables users to quickly obtain the right information from said document at the right time for decision-making.

Electronic Document Browsing Method

Under the same inventive concept, an electronic document browsing method is provided according to another aspect of the invention. The electronic document is the one generated by the above document processing method, that is, correspondingly storing the information segments (which relate to different domains) extracted from the electronic document with said electronic document.

Figure 3:
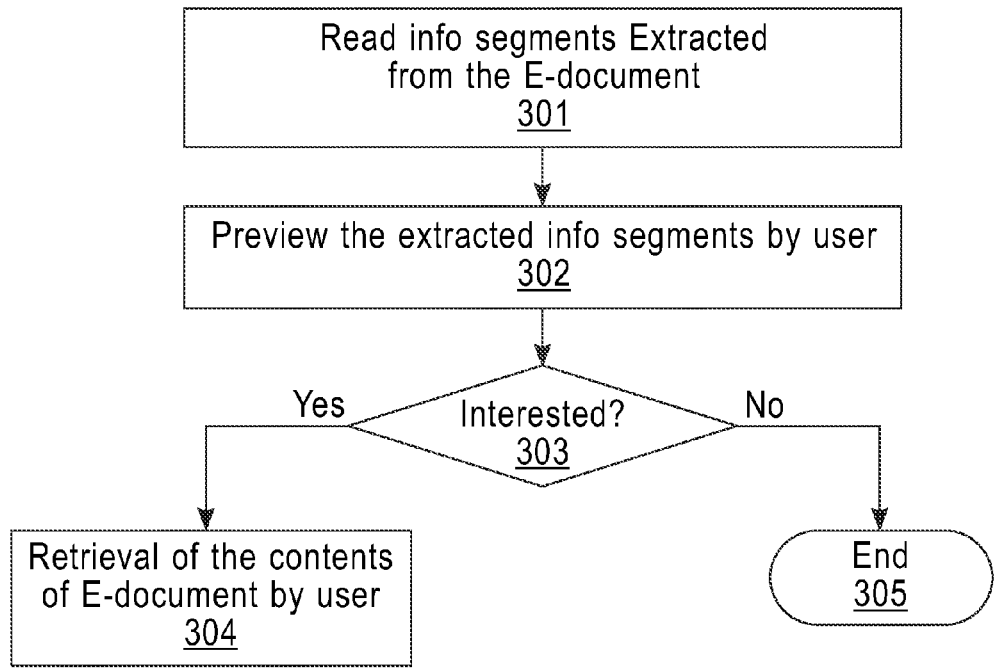
FIG. 3 is a flowchart showing an electronic document browsing method according to an embodiment of the present invention.

FIG. 3 is a flowchart showing an electronic document browsing method according to an embodiment of the present invention. As shown in FIG. 3, first of all, process 301 is to read the different domain specific information segments extracted from said document. Specifically, reading the extracted information segments according to their storing method. For example, if the extracted information segments are stored at the end of the electronic document as knowledge tags, identify the knowledge tags and retrieve the information segments therein as well.

The following process is 302 wherein presenting readers (users) with the read information segments extracted from said document. Practically, a number of methods can be adopted to present the relevant extracted information segments.

Then comes to process 303 wherein the reader examines the extracted information segments, and makes a judgment on whether he is interested in them; if so, confirm it and go on with process 304 to have the electronic document content presented; otherwise, it's not necessary to present the content of the electronic document, and come to an end in process 305.

As will be apparent in light of the foregoing disclosure of the above embodiment, when the electronic document browsing method of the present embodiment is adopted, the accuracy of the information segments extracted from the electronic document can be ensured by taking advantage of the writer's comprehension over the electronic document without bringing additional workload to the writer. Moreover, as it is possible to extract information segments which fully reflect the domains to which the electronic document relates, therefore users can make retrievals and previews on the electronic document which relates to different domains but one particular subject by the extracted information segments. On the other hand, it's saving users' reading time by firstly providing them with the information segments concerning the domains to which the electronic document roughly relates before presenting the full content of the electronic document to them; on the other hand, it enables users to quickly obtain the right information form said document at the right time for decision-making.

Electronic Document Browser

Under the same invention concept, an electronic document browser is provided according to another aspect of the invention. The electronic document is the one generated by the above document processing method, that is, correspondingly store the information segments (which relates to different domains) extracted from the electronic document with said document.

Figure 4:
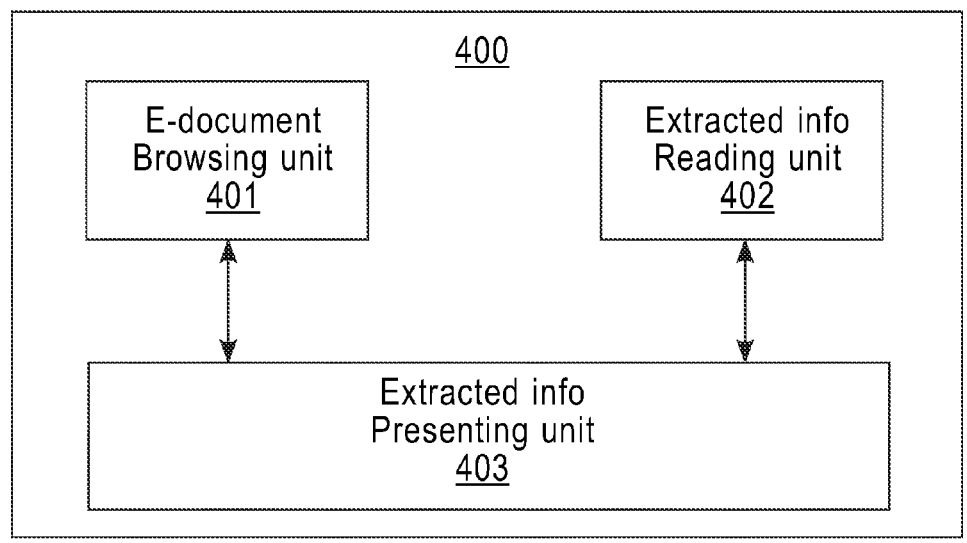
FIG. 4 is a block schematic diagram showing the structure of an electronic document browser according to an embodiment of the present invention.

FIG. 4 is a block schematic diagram showing the structure of an electronic document browser according to an embodiment of the present invention. As shown in FIG. 4, the electronic document browser 400 of the present embodiment comprises an electronic document browsing unit 401 for browsing the electronic document content, which can be an existing browser, such as MS Word Viewer, MS Internet Explorer, Netscape Navigator, Acrobat Reader, etc.;

An extracted information reading unit 402 for reading the different domain specific information segments which are extracted from the electronic document and correspondingly stored with said document. Specifically, read the extracted information segments according to their storing methods. For example, if the extracted information segments are stored at the end of the electronic document as knowledge tags, identify the knowledge tags and read the information segments therein as well;

An extracted information presenting unit 403 for presenting the user with the extracted information segments read by the extracted information reading unit 402. Particularly, a number of methods can be adopted to present the relevant information segments extracted from said document.

As will be apparent in the light of the foregoing disclosure of the above embodiment, when the electronic document browser according to the present embodiment is adopted, the accuracy of the information segments extracted from the electronic document can be ensured by taking advantage of the writer's comprehension over the electronic document without bringing additional workload to the writer. Moreover, as it is possible to extract information segments which fully reflect the domains to which the electronic documents relates, therefore users can make retrievals and previews on the electronic document which relates to different domains but one particular subject by the extracted information segments. On the other hand, it's saving users' reading time by firstly providing them with the information segments reflecting the domains to which the electronic document relates before presenting the full content of the electronic document to them; on the other hand, it enables users to quickly obtain the right information from said document at the right time for decision-making.

Information Extracting Method of the Electronic Document

Under the same inventive concept, an electronic document information extracting method is provided according to another aspect of the invention. The electronic document is the one generated by the above document processing method, that is, correspondingly store the information segments (which relates to different domains) extracted from the electronic document with said document.

Figure 5:
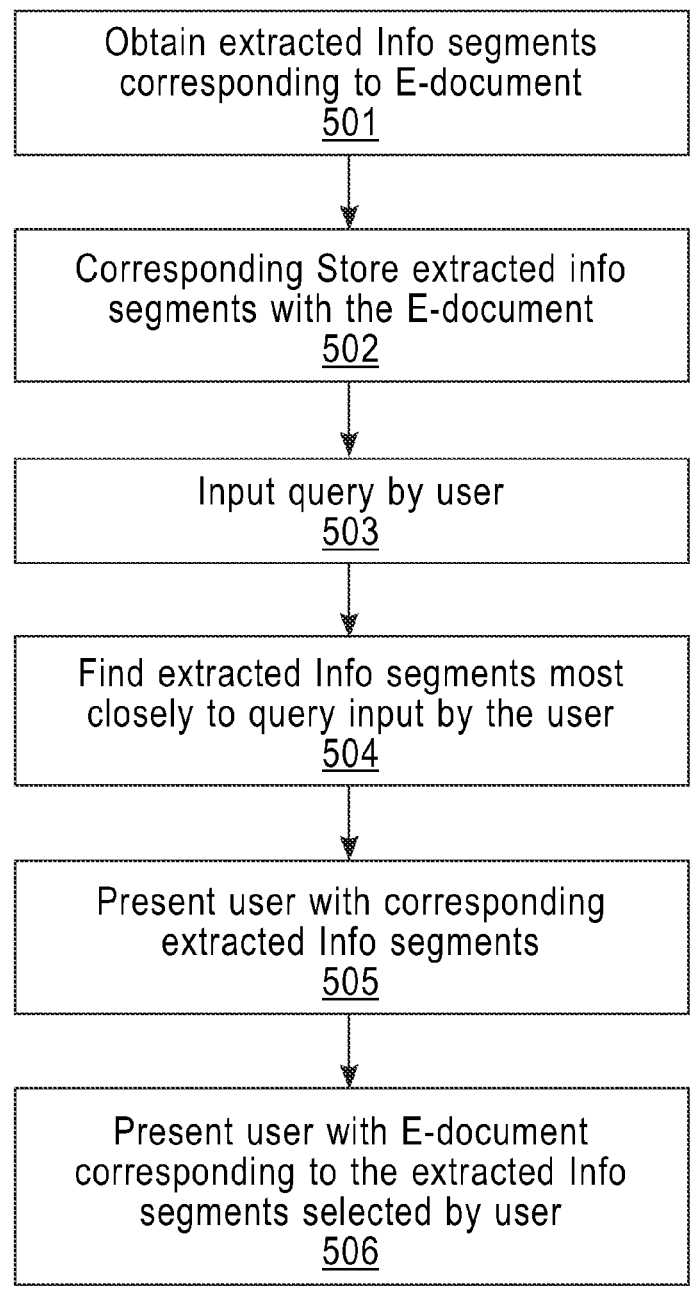
FIG. 5 is a flowchart showing an electronic document information extracting method according to an embodiment of the present invention.

FIG. 5 is a flowchart showing an electronic document information extracting method according to an embodiment of the invention. As shown in FIG. 5, first of all, process 501 is to obtain the information segments which are extracted from the electronic document and correspondingly stored with said document. Specifically, if the electronic document is edited by the above electronic document processing device 200, each document will be attached with the information segments (which relate to different domains) extracted from said document. Particularly, for the documents issued on Internet, Web Crawler can be used to roll out each document and obtain the information segments concerning different domains, for example, obtain the information from knowledge tags.

The next process is 502 wherein storing the obtained information segments which are extracted from said document into a database for extracted information segments.

The next process is 503 wherein the user enters one query.

The next process is 504 wherein locating the list of extracted information segments corresponding to the query entered by the user in said database for extracted information segments.

And then comes process 505 wherein presenting said user with the information segments which are identical or most similar to the user's query, by which the user can have an idea of the content to which the electronic document roughly relates and is enabled to quickly make a decision. The process can also comprises calculating the relevance degree between the query entered by the user and each extracted information segments in the list of extracted information segments, and selecting the extracted information segments whose relevance degree rank highest or is higher than a predefined threshold. Moreover, process 506 is providing the electronic document corresponding to the information segments chosen by the user or the link to said document to said user who intends to know more content.

As will be apparent in the light of the foregoing disclosure of the above embodiment, when the electronic document information extracting method of the present embodiment is adopted, the accuracy of the information segments extracted from the electronic document can be ensured by taking advantage of the writer's comprehension over the electronic document without bringing additional workload to the writer. Moreover, as it is possible to extract several information segments which fully reflect the domains to which the electronic document relates, therefore users can make retrievals and previews on the electronic document which relates to different domains but one particular subject by the extracted information segments. On the other hand, it's saving users' reading time by firstly providing them with the information segments reflecting the domains to which the electronic document roughly relates before presenting the fall content of the electronic document to them; on the other hand, it enables users to quickly obtain the right information from said document at the right time for decision-making.

Information Extracting System of the Electronic Document

Under the same inventive concept, an electronic document information extracting system is provided according to another aspect of the invention. The electronic document is the one generated by the foregoing document processing method, that is, correspondingly store the information segments (which concern different domains) extracted from the electronic document with said document.

Figure 6:
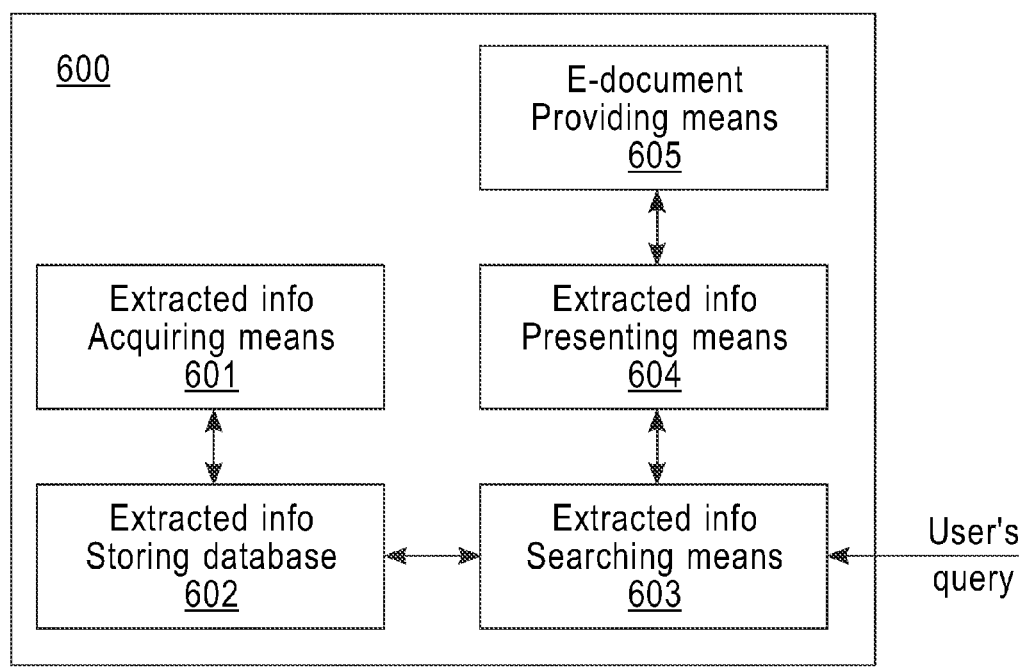
FIG. 6 is a block schematic diagram showing the structure of an electronic document information extracting system according to an embodiment of the present invention.

Corresponding to the electronic document information extracting method illustrated in FIG. 5, FIG. 6 is a block schematic diagram showing the structure of an electronic document information extracting system according to an embodiment of the invention.

As shown in FIG. 6, the electronic document information extracting system comprises: an extracted information acquiring means 601 for acquiring the information segments that are correspondingly stored with the electronic document and extracted from said document. In the light of the forgoing disclosure, the extracted information acquiring means 601 can be a web crawler which can roll out each document published on web to obtain the information segments extracted from said document; an extracted information storing database 602 for storing the extracted information segments obtained by the extracted information obtaining means 601; an extracted information searching means 603 for searching one or more extracted information segments which are identical or most similar to the query entered by user from the extracted information storing database 602 according to the user's query, for example, it can comprise one relevance degree calculating means for calculating the relevance degree between the query entered by the user and each extracted information segments in the extracted information list, thereby said extracted information searching means 603 will select the extracted information segments whose relevance degree is the highest or higher than a predefined threshold according to the result calculated by the relevance degree calculating means; an extracted information presenting means 604 for presenting one or more extracted information searched by the extracted information searching means 603 to the user, by which the user can roughly have an idea of the electronic document content and is enabled to make a decision as soon as possible. Furthermore, the information extracting system of electronic document according to the present embodiment can also comprise an electronic document providing means 605 for providing the user with the electronic document corresponding to the extracted information segments selected by said user and the link to said document.

As will be apparent in the light of the disclosure of the above embodiment, when the electronic document information extracting system of the present embodiment is adopted, the foregoing document information extracting method can be implemented, and the accuracy of the information segments extracted from the electronic document can be ensured by taking advantage of the writer's comprehension over the electronic document without bringing additional workload to the writer. Moreover, as it is possible to extract several information segments which fully reflect the domains to which the electronic document relates, therefore users can make retrievals and previews on the electronic document which relates to different domains but one particular subject by the extracted information segments. On the other hand, it's saving users' reading time by firstly providing them with the information segments reflecting the domains to which the electronic document roughly relates before presenting the full content of the electronic document to them; on the other hand, it enables users to quickly obtain the right information from said document at the right time for decision-making.

The method for processing an electronic document and its corresponding device, the method for browsing an electronic document and its corresponding browser, and the method for extracting information from an electronic document and its corresponding system for the same are disclosed above through examples, but it should be noted that these embodiments are only exemplary examples, persons skilled in this technical field can make various alterations or modifications in implementing of the present invention without departing from the spirit or scope thereof. Therefore, the invention is not limited to these embodiments, and is only defined by the following claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and method, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An electronic document processing device, comprising:
   a memory device;
   a processor coupled to the memory device,
   wherein the processor is configured to perform:
   enabling an author to write an original electronic document;
   selecting an information extraction pattern for said document from various information extraction patterns, while said author is writing said original electronic document;
   extracting one or more domain specific information segments from said electronic document according to the information extraction patterns selected, while said author is writing said original electronic document;
   selecting a list of information segments most relevant to said document from said one or more domain specific information segments, while said author is writing said original electronic document;
   correspondingly storing the list of information segments with said document, while said author is writing said original electronic document;
   searching said one or more extracted domain specific information segments;
   presenting said one or more extracted domain specific information segments to a subsequent user; and
   providing the user with said electronic document based on said subsequent user's interest in said electronic document.

2. The electronic document processing device as set forth in claim 1, wherein the processor is further configured to perform:
   evaluating and modifying the extracted domain-specific information segments so as to ensure correctness, readability and usefulness of said list of information segments.

3. The electronic document processing device as set forth in claim 2, wherein the processor is further configured to perform:
   presenting reference information segments of one or more extracted domain specific information segments corresponding to each information extraction pattern;
   calculating the similarity between the extracted domain specific information segments and the reference information segments corresponding to each information extraction pattern; and
   selecting the extracted domain specific information segments, which are ranked by the similarity values, with higher ranking values.

4. The electronic document processing device as set forth in claim 1, wherein the processor is further configured to perform:
  presenting the reference information segments of one or more extracted domain specific information segments which correspond to each information extracted pattern;
  calculating the similarity between the sentence in the edited electronic document and the reference information segments for each information extraction pattern; and
  identifying the extraction patterns, which are ranked by the similarity values, with higher ranking values for said document.

5. The electronic document processing device as set forth in claim 1, wherein the processor is further configured to perform:
  organizing the extraction patterns into a hierarchy structure according to the domain or level to which each extraction pattern belongs.

6. An information extracting method for an original electronic document, comprising the steps of:
  extracting from said original electronic document, while said electronic document is being written by an author, one or more information segments according to a predetermined extraction pattern, said one or more information segments relating to a specific domain to which the electronic document relates being written by said author;
  storing the one or more domain specific information segments with the electronic document;
  extracting said stored one or more domain specific information segments to facilitate a subsequent user's use of the electronic document based on the one or more domain specific information segments, while an author is writing the original electronic document;
  searching a list of the extracted domain specific information segments corresponding to a query entered by a subsequent user; and
  previewing, by said subsequent user, said one or more domain specific information segments to determine his or her interest in said electronic document; and
  retrieving, by said subsequent user, said electronic document if said subsequent user is interested in said electronic document,
  wherein a processor coupled to a memory device is configured to perform: the extracting from the original document, the storing, the extracting the stored one or more domain specific information segments, the searching, the previewing, and the retrieving.

7. The information extracting method of electronic document as set forth in claim 6, further comprising:
  calculating the relevance degree between the query entered by the subsequent user and each extracted domain specific information segments in the list of extracted domain specific information, and
  selecting the extracted domain specific information segments whose relevance degree rank highest or higher than a predefined threshold.

8. The information extracting method for electronic document as set forth in claim 6, farther comprising:
  providing the subsequent user with the electronic document corresponding to domain specific information segments chosen by said subsequent user or the link to said document.

9. An information extracting system for an original electronic document, comprising:
  a memory device;
  a processor coupled to the memory device,
  wherein the processor is configured to perform:
  editing an electronic document;
  selecting an information extraction pattern for said electronic document from various information extraction patterns;
  acquiring domain specific information segments according to said information extraction patterns selected, while an author is writing the original electronic document;
  selecting a list of information segments most relevant to said electronic document from said one or more domain specific information segments;
  storing said list of information segments with said electronic document while the author is writing the original electronic document;
  searching one or more extracted domain specific information segments which are identical or most similar to user's query; and
  presenting the user with the searched one or more extracted domain specific information segments; and
  providing the user with said electronic document based on said user's interest in said electronic document.

10. The information extracting system for electronic document as set forth in claim 9, wherein the processor is further configured to perform:
  calculating the relevance degree between the query entered by the user and each extracted domain specific information segments; and
  selecting the extracted domain specific information segments whose calculated relevance degree are the highest or higher than a predefined threshold.

11. The information extracting system for electronic document as set forth in claim 10, wherein the processor is configured to perform:
  providing the user with the electronic document corresponding to the selected extracted domain specific information segments or the link to said document.

12. An article of manufacture comprising a computer usable medium, the computer usable medium excluding a propagating signal, the computer usable medium having computer readable program code means embodied therein for causing electronic document processing, the computer readable program code means in said article of manufacture comprising computer readable program code means for causing a computer to effect the steps of claim 1.

13. A computer program product comprising a computer usable medium, the computer usable medium excluding a propagating signal, the computer usable medium having computer readable program code means embodied therein for causing functions of an electronic document processing device, the computer readable program code means in said computer program product comprising computer readable program code means for causing a computer to effect the functions of claim 1.

14. An article of manufacture comprising a computer usable medium, the computer usable medium excluding a propagating signal, the computer usable medium having computer readable program code means embodied therein for causing information extraction, the computer readable program code means in said article of manufacture comprising computer readable program code means for causing a computer to effect the steps of claim 6.

15. A computer program product comprising a computer usable medium, the computer usable medium excluding a propagating signal, the computer usable medium having computer readable program code means embodied therein for causing information extraction, the computer readable program code means in said computer product comprising computer readable program code means for causing a computer to effect the functions of claim 9.

* * * * *